United States Patent
Shi et al.

(10) Patent No.: US 10,276,120 B2
(45) Date of Patent: Apr. 30, 2019

(54) DRIVING CIRCUIT AND A PULL DOWN MAINTAINING CIRCUIT AND A DISPLAY APPARATUS THEREOF ARE PROVIDED

(71) Applicant: Shenzhen China Star Optoelectronics Technology Co., Ltd., Shenzhen, Guangdong (CN)

(72) Inventors: Longqiang Shi, Guangdong (CN); Shu-Jhih Chen, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 122 days.

(21) Appl. No.: 15/327,640

(22) PCT Filed: Jan. 16, 2017

(86) PCT No.: PCT/CN2017/071242
§ 371 (c)(1),
(2) Date: Jan. 19, 2017

(87) PCT Pub. No.: WO2018/120320
PCT Pub. Date: Jul. 5, 2018

(65) Prior Publication Data
US 2018/0211614 A1 Jul. 26, 2018

(30) Foreign Application Priority Data
Dec. 30, 2016 (CN) .......................... 2016 1 12618733

(51) Int. Cl.
*G09G 3/36* (2006.01)
*G02F 1/133* (2006.01)
(52) U.S. Cl.
CPC ............. *G09G 3/3677* (2013.01); *G09G 3/36* (2013.01); *G02F 1/13306* (2013.01);
(Continued)

(58) Field of Classification Search
CPC ...... G09G 3/36; G09G 3/3674; G09G 3/3677; G09G 3/3696; G09G 2310/0264;
(Continued)

(56) References Cited

U.S. PATENT DOCUMENTS

2011/0002438 A1\* 1/2011 Kim ....................... G11C 19/28
377/67
2012/0163528 A1\* 6/2012 Jang ..................... G09G 3/3688
377/64

(Continued)

FOREIGN PATENT DOCUMENTS

CN 104361852 A 2/2015
KR 1020120011966 A 2/2012

*Primary Examiner* — Darlene M Ritchie
(74) *Attorney, Agent, or Firm* — Andrew C. Cheng (57) ABSTRACT

The present application discloses a pull down maintaining circuit, comprising: a first switch transistor, an input terminal is connected to a first direct current power source, and an output terminal outputting a scanning signal of the Nth level scanning line; a second switch transistor, an input terminal is connected to the first direct current power source, and an output terminal outputting a scanning electric level signal of the Nth level scanning line; a control unit for controlling the first and the second switch transistors to turn off in accordance with a low voltage outputted from the first and the second direct current power source, and the third direct current power source, and to control the first and the second switch transistors to normally turn on in accordance with a high voltage is outputted from the first and the second direct current power source, and the third direct current power source.

6 Claims, 3 Drawing Sheets

(52) U.S. Cl.
CPC ............ *G09G 2300/0408* (2013.01); *G09G 2310/0264* (2013.01); *G09G 2310/0286* (2013.01)

(58) Field of Classification Search
CPC ... G09G 2310/0251; G09G 2310/0286; G09G 2300/0408; G02F 1/13306
See application file for complete search history.

(56) References Cited

U.S. PATENT DOCUMENTS

| | | | |
|---|---|---|---|
| 2014/0093252 A1* | 4/2014 | Yamashita | G09G 3/3677 398/141 |
| 2014/0241488 A1* | 8/2014 | Jang | G11C 19/28 377/64 |
| 2014/0354523 A1* | 12/2014 | So | G09G 3/3677 345/100 |
| 2015/0015562 A1* | 1/2015 | Han | G09G 3/3266 345/212 |
| 2015/0317954 A1 | 11/2015 | Jang | |
| 2016/0266699 A1 | 9/2016 | Zhao et al. | |
| 2016/0284304 A1 | 9/2016 | Dai | |
| 2017/0032752 A1 | 2/2017 | Huang et al. | |

\* cited by examiner

FIG. 1

(Prior Art)

DRIVING CIRCUIT AND A PULL DOWN MAINTAINING CIRCUIT AND A DISPLAY APPARATUS THEREOF ARE PROVIDED

FIELD OF THE INVENTION

The present application relates to a panel display technology field, and more particularly to a driving circuit and a pull down maintaining circuit and a display apparatus thereof are provided.

BACKGROUND OF THE INVENTION

Gate Driver on Array, GOA technology can help to fabricate narrow border or borderless display products, and it can reduce the binding process for the external integrated circuit, IC in addition it is conducive to enhance productivity and reduce product costs, and has been widely used and research. Currently, Indium Gallium Zinc Oxide, IGZO is used to make a GOA circuit because of its high mobility and good device stability which reduces the complexity of a GOA circuit. In particular, because of its high mobility, when used in the fabrication of thin film transistors in GOA circuits, the size of the thin film transistor is lower relative to the thin film transistor fabricated using amorphous silicon, a-Si, which is conducive to the production of a narrow-border display; at the same time, due to the good device stability, it is possible to reduce the number of power supplies and thin film transistors for stabilizing the performance of the thin film transistor, and then to create a relatively simple GOA circuit, and reduce power consumption.

Figure 1:
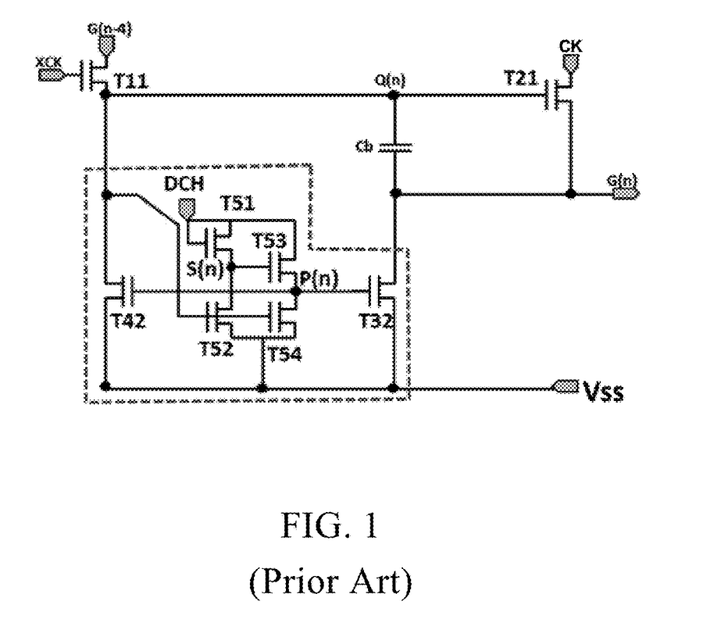
FIG. 1 is a circuit diagram of a pull down maintaining circuit in the conventional technology.

Referring to FIG. 1, FIG. 1 is a partial circuit diagram of a GOA circuit in the conventional technology, wherein the GOA circuit is formed by IGZO. Since the initial electrical characteristics of the IGZO are easily formed as a depletion-mode semiconductor thin film transistor, such a transistor has a negative value turn on voltage Vth, and in the GOA circuit, the transistor T32 and T42 in the pull down maintaining unit (shown in the dashed box in FIG. 1) is affected by the material, the turn on voltage Vth being positively shifted it can be seen that when the thin film transistor fabricated by IGZO is used in the pull down maintaining unit, a turn on voltage Vth in negative value is likely to occur, resulting in a forward voltage shift.

SUMMARY OF THE INVENTION

The object of the present application is to provide a driving circuit, a pull down maintaining circuit and a display apparatus, aiming to solve the problems occurred by using a thin film transistor fabricated by IGZO for pull down maintaining unit in the conventional technology. It can effectively compatible with the situation of the turn on voltage Vth in negative value of the thin film transistor fabricated by IGZO.

The present application has been made to solve the above-mentioned problems by providing a driving circuit for driving an Nth level scanning line for the liquid crystal display, wherein, including: a pull up module for pulling up the scanning signal of the Nth level scanning line in accordance with the scanning electric level signal of the Nth level scanning line and a clock signal; a pull down maintaining module for maintaining the scanning electric level signal of the Nth level scanning line and the low electric level of the scanning signal of the Nth level scanning line outputted from the pull up module; wherein the pull down maintaining module including: a first switch transistor, an input terminal is connected to a first direct current power source, and an output terminal outputting a scanning signal of the Nth level scanning line; a second switch transistor, an input terminal is connected to the first direct current power source, and an output terminal outputting a scanning electric level signal of the Nth level scanning line; a control unit, a first input terminal is connected to the first direct current power source, a second input terminal is connected to a second direct current power source, a third input terminal is connected to a third direct current power source, an output terminal is connected to a control terminal of the first switch transistor and a control terminal of the second switch transistor respectively, the control unit is for controlling the first switch transistor and the second switch transistor to turn off in accordance with a low voltage outputted from the first direct current power source, the second direct current power source, and the third direct current power source, and to control the first switch transistor and the second switch transistor to normally turn on in accordance with a high voltage is outputted from the first direct current power source, the second direct current power source, and the third direct current power source; wherein the low voltage is lower than the voltage outputted from the first direct current power source, both the voltages outputted from the first direct current power source and the second direct current power source are lower than the voltage outputted from the third direct current power source; the first switch transistor and the second switch transistor are fabricated by indium gallium zinc oxide respectively; the control unit including: a third switch transistor, a control terminal and an input terminal are respectively connected to the third direct current power source, an output terminal is connected to a second circuit point; a fourth switch transistor, a control terminal is inputted the scanning electric level signal of the Nth level scanning line, an input terminal is connected to the first direct current power source, an output terminal is connected to the second circuit point; a fifth switch transistor, a control terminal is connected to the second circuit point, an input terminal is connected to the third direct current power source, an output terminal is connected to the first circuit point; a sixth switch transistor, a control terminal is inputted the scanning electric level signal of the Nth level scanning line, an input terminal is connected to the second direct current power source and an output terminal is connected to the first circuit point; wherein, the control terminal and the input terminal of the third switch transistor, the input terminal of the fifth switch transistor serve as a third input terminal of the control unit; the input terminal of the fourth switch transistor serves as a first input terminal of the control unit; the input terminal of the sixth switch transistor serves as a second input terminal of the control unit; the first circuit point serves as an output terminal of the control unit; the equivalent resistance of the fifth switch transistor is greater than the equivalent resistance of the sixth switch transistor; and the third switch transistor, the fourth switch transistor, the fifth switch transistor, and the sixth switch transistor are respectively fabricated by the indium gallium zinc oxide.

Wherein the low voltage is the voltage outputted by the second direct current power source.

The present application has been made to solve the above-mentioned problems by providing a pull down maintaining circuit applied for the Nth level driving circuit of the liquid crystal display, including: a first switch transistor, an input terminal is connected to a first direct current power source, and an output terminal outputting a scanning signal of the Nth level scanning line; a second switch transistor, an input terminal is connected to the first direct current power source, and an output terminal outputting a scanning electric level signal of the Nth level scanning line; a control unit, a first input terminal is connected to the first direct current power source, a second input terminal is connected to a second direct current power source, a third input terminal is connected to a third direct current power source, an output terminal is connected to a control terminal of the first switch transistor and a control terminal of the second switch transistor respectively, the control unit is for controlling the first switch transistor and the second switch transistor to turn off in accordance with a low voltage outputted from the first direct current power source, the second direct current power source, and the third direct current power source, and to control the first switch transistor and the second switch transistor to normally turn on in accordance with a high voltage is outputted from the first direct current power source, the second direct current power source, and the third direct current power source; wherein the low voltage is lower than the voltage outputted from the first direct current power source, both the voltages outputted from the first direct current power source and the second direct current power source are lower than the voltage outputted from the third direct current power source; the first switch transistor and the second switch transistor are fabricated by indium gallium zinc oxide respectively.

Wherein the low voltage is the voltage outputted by the second direct current power source.

Wherein the control unit including: a third switch transistor, a control terminal and an input terminal are respectively connected to the third direct current power source, an output terminal is connected to a second circuit point; a fourth switch transistor, a control terminal is inputted the scanning electric level signal of the Nth level scanning line, an input terminal is connected to the first direct current power source, an output terminal is connected to the second circuit point; a fifth switch transistor, a control terminal is connected to the second circuit point, an input terminal is connected to the third direct current power source, an output terminal is connected to the first circuit point; a sixth switch transistor, a control terminal is inputted the scanning electric level signal of the Nth level scanning line, an input terminal is connected to the second direct current power source and an output terminal is connected to the first circuit point; and wherein, the control terminal and the input terminal of the third switch transistor, the input terminal of the fifth switch transistor serve as a third input terminal of the control unit; the input terminal of the fourth switch transistor serves as a first input terminal of the control unit; the input terminal of the sixth switch transistor serves as a second input terminal of the control unit; the first circuit point serves as an output terminal of the control unit.

Wherein the equivalent resistance of the fifth switch transistor is smaller than the equivalent resistance of the sixth switch transistor; and the third switch transistor, the fourth switch transistor, the fifth switch transistor, and the sixth switch transistor are respectively fabricated by the indium gallium zinc oxide.

The present application has been made to solve the above-mentioned problems by providing a pull down maintaining circuit applied for the Nth level driving circuit of the liquid crystal display including a first pull down maintaining unit and a second pull down maintaining unit, wherein the first pull down maintaining unit including: a first switch transistor, an input terminal is connected to a first direct current power source, an output terminal outputted the scanning signal of the Nth level scanning line; a second switch transistor, an input terminal is connected to the first direct current power source, an output terminal outputted the scanning electric level signal of the Nth level scanning line; a first control unit, a first input terminal is connected to the first direct current power source, a second input terminal is connected to a second low frequency alternating current power source, a third input terminal is connected to a first low frequency alternating current power source, an output terminal is connected to the control terminal of the first switch transistor and the control terminal of the second switch transistor, the first control unit is used to control the first switch transistor and the second switch transistor to turn off in accordance with a low voltage outputted from the first direct current power source, the first low frequency alternating current power source, and the second low frequency alternating current power source, and to control the first switch transistor and the second switch transistor to normally turn on in accordance with a high voltage outputted from the first direct current power source, the first low frequency alternating current power source and the second low frequency alternating current power source; the second pull down maintaining unit including: an eighth switch transistor, an input terminal is connected to the first direct current power source, an output terminal outputting the scanning signal of the Nth level scanning line; a ninth switch transistor, an input terminal is connected to the first direct current power source, an output terminal outputting the scanning electric level signal of the Nth level scanning line; a second control unit, a first input terminal is connected to the first direct current power source, a second input terminal is connected to the first low frequency alternating current power source, a third input terminal is connected to the second low frequency alternating current power source, an output terminal is connected to the control terminal of the eighth switch transistor and the control terminal of the ninth switch transistor, the second control unit is used to control the eighth switch transistor and the ninth switch transistor to turn off in accordance with a low voltage outputted from the first direct current power source, the first low frequency alternating current power source, and the second low frequency alternating current power source, and to control the eighth switch transistor and the ninth switch transistor to be normally turned on in accordance with a high voltage outputted from the first direct current power source, the first low frequency alternating current power source and the second low frequency alternating current power source; wherein the voltage outputted from the first low frequency alternating current power source is opposite to the voltage output from the second low frequency alternating current power source, and the low voltage is lower than the voltage outputted from the first Direct current power source; the first switch transistor, the second switch transistor, the eighth switch transistor and the ninth switch transistor are fabricated by indium gallium zinc oxide.

Wherein the low voltage is the voltage outputted by the first low frequency alternating current power source or the voltage output from the second low frequency alternating current power source.

Wherein the first control unit including: a third switch transistor, a control terminal and an input terminal are connected to the first low frequency alternating current power source, respectively, an output terminal is connected to a second circuit point; a fourth switch transistor, a control terminal inputs the scanning electric level signal of the Nth level scanning line, an input terminal is connected to the first direct current power source, an output terminal is connected to the second circuit point; a fifth switch transistor, a control terminal of the is connected to the second circuit point, an input terminal is connected to the first low frequency alternating current power source, an output terminal is connected to a first circuit point; a sixth switch transistor, a control terminal inputs the scanning electric level signal of the Nth level scanning line, an input terminal is connected to the second low frequency alternating current power source; a seventh switch transistor, an input terminal of the is connected to the output terminal of the sixth switch transistor, an output terminal is connected to the first circuit point, a control terminal is connected to the first low frequency alternating current power source; wherein the control terminal and the input terminal of the third switch transistor and the input terminal of the fifth switch transistor serve as the third input terminal of the first control unit; the input terminal of the fourth switch transistor serves as the first input terminal of the first control unit; the input terminal of the sixth switch transistor serves as the second input terminal of the first control unit; the first circuit point serves as the output terminal of the first control unit; the second control unit including: a tenth switch transistor, a control terminal and an input terminal of the tenth switch transistor are connected to the second low frequency alternating current power source respectively, an output terminal is connected to the fourth circuit point; an eleventh switch transistor, a control terminal inputs the scanning electric level signal of the Nth level scanning line, an input terminal is connected to the first direct current power source, an output terminal is connected to a fourth circuit point; a twelfth switch transistor, a control terminal is connected to the fourth circuit point, an input terminal is connected to the second low frequency alternating current power source, an output terminal is connected to a third circuit point; a thirteenth switch transistor, a control terminal inputs the scanning electric level signal of the Nth level scanning line, an input terminal is connected to the first low frequency Alternating current power source; a fourteenth switch transistor, an input terminal is connected to the output terminal of the thirteenth switch transistor, an output terminal is connected to the third circuit point, a control terminal is connected to the second low frequency alternating current power source; wherein the control terminal and the input terminal of the tenth switch transistor, the input terminal of the thirteenth switch transistor serve as a third input terminal of the second control unit; the input terminal of the eleventh switch transistor serves as a first input terminal of the second control unit; the input terminal of the thirteenth switch transistor serves as a second input terminal of the second control unit; the second circuit point serves as the output terminal of the second control unit.

Wherein the equivalent resistance of the fifth switch transistor is smaller than the equivalent resistance of the sixth switch transistor; the equivalent resistance of the twelfth switch transistor is smaller than the equivalent resistance of the thirteenth switch transistor; the third switch transistor, the fourth switch transistor, the fifth switch transistor, the sixth switch transistor, the seventh switch transistor, the tenth switch transistor, the eleventh switch transistor, the twelfth switch transistor, the thirteenth switch transistor and the fourteenth switch transistor are fabricated by indium gallium zinc oxide respectively.

According to another aspect of the present application to solve the above-mentioned problems is to provide a driving circuit for the driving operation of the Nth level scanning line of the liquid crystal display including: a pull up module for pull up the scanning signal of the Nth level scanning line in accordance with the scanning electric level signal of the Nth level scanning line and a clock signal; a pull down maintaining module for maintaining the scanning electric level signal of the Nth level scanning line and the low electric level of the scanning signal of the Nth level scanning line outputted from the pull up module; wherein, the pull down maintaining module is the pull down maintaining circuit described above.

According to another aspect of the present application to solve the above-mentioned problems is to provide a display apparatus including the driving circuit described above.

The advantage of the present application is the pull down maintaining circuit of the present application is effectively compatible with the situation of the turn on voltage Vth in negative value of the thin film transistor fabricated by IGZO and thereby preventing a phenomenon that the initial turn on voltage of the switch transistor is negative value.

BRIEF DESCRIPTION OF THE DRAWINGS

In order to more clearly illustrate the embodiments of the present application or prior art, the following figures will be described in the embodiments are briefly introduced.

It is obvious that the drawings are merely some embodiments of the present application, those of ordinary skill in this field can obtain other figures according to these figures without paying the premise.

DETAILED DESCRIPTION OF PREFERRED EMBODIMENTS

Embodiments of the present application are described in detail with the technical matters, structural features, achieved objects, and effects with reference to the accompanying drawings as follows. It is clear that the described embodiments are part of embodiments of the present application, but not all embodiments. Based on the embodiments of the present application, all other embodiments to those of ordinary skill in the premise of no creative efforts acquired should be considered within the scope of protection of the present application.

Specifically, the terminologies in the embodiments of the present application are merely for describing the purpose of the certain embodiment, but not to limit the invention.

Figure 2:
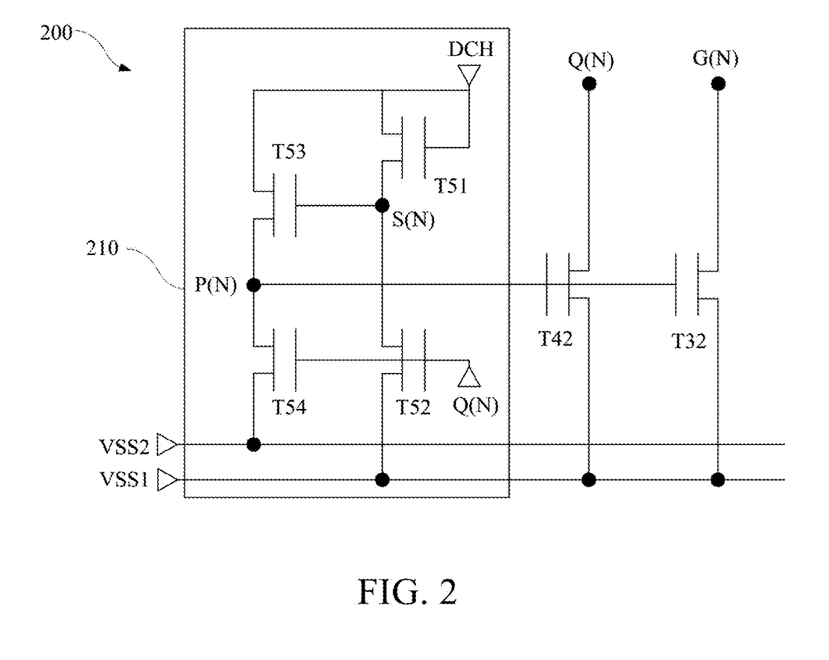
FIG. 2 is a schematic diagram of a pull down maintaining circuit in a first embodiment of the present application.

As illustrated in FIG. 2 is a schematic diagram of a pull down maintaining circuit in a first embodiment of the present application. The pull down maintaining circuit is applied to an Nth level driving circuit for the liquid crystal display. The main function is to maintain the scanning electric level signal Q(N) of the Nth level scanning line and the scanning signal G(N) outputted from the Nth level scanning line of the pull up circuit in the driving circuit at a low electric level, the context of the description that is within a person skilled in the art will not be described in detail.

The pull down maintaining circuit 200 includes a first switch transistor T32, a second switch transistor T42, and a control unit 210 wherein an input terminal of the first switch transistor T32 is connected to a first direct current power source VSS1, and an output terminal outputting a scanning signal G(N) of the Nth level scanning line; an input terminal of the second switch transistor T42 is connected to the first direct current power source VSS1 and an output terminal outputting a scanning electric level signal Q(N) of the Nth level scanning line; a first input terminal of the control unit 210 is connected to the first direct current power source VSS1, a second input terminal is connected to the second direct current power source VSS2, a third input terminal is connected to the third direct current power source DCH, an output terminal is connected to the control terminal of the first switch transistor T32 and the control terminal of the second switch transistor T42.

Wherein the low voltage is lower than a voltage outputted from the first direct current power source VSS1. Both the voltage outputted from the first direct current power source VSS1 and a voltage outputted from the second direct current power source VSS2 are lower than a voltage outputted from the third direct current power source DCH; the first switch transistor T32 and the second switch transistor T42 are made of indium gallium zinc oxide respectively.

In the present embodiment, the control unit 210 controls the first switch transistor T32 and the second switch according to the respectively voltage outputted from the first direct current power source VSS1, the second direct current power source VSS2, and the third direct current power source DCH, so that the first switch transistor T32 and the second switch transistor T42 are turned off, to be effectively compatible with the situation of the turn on voltage in negative value of the thin film transistor fabricate by the IGZO, thereby preventing a phenomenon that the initial turn on voltage of the first switch transistor T32 and the second switch transistor T42 is negative value and causing the first switch transistor T32 and the second switch transistor T42 to normally turn on.

Further, in the present embodiment, the above-described low voltage is the voltage outputted from the second direct current power source VSS2. And the voltage outputted from the second direct current power source VSS2 is lower than the voltage output from the first direct current power source VSS1. It should be noted that the low voltage refers to a low voltage that the low voltage outputs from the control unit 210 to control the first switch transistor T32 and the second switch transistor T42 to be turned off.

Specifically, as illustrated in FIG. 2, in the present embodiment, the control unit 210 includes a third switch transistor T51, a fourth switch transistor T52, a fifth switch transistor T53, and a sixth switch transistor T54. A control terminal and an input terminal of the third switch transistor T51 are respectively connected to the third direct current power source DCH, an output terminal is connected to a second circuit point S(N); a control terminal of the fourth switch transistor T52 is inputted to the scanning electric level signal Q(N) of the Nth level scanning line; an input terminal is connected to the first direct current power source VSS1, an output terminal is connected to the second circuit point S(N); a control terminal of the fifth switch transistor T53 is connected to the second circuit point S(N), an input terminal is connected to the third direct current power source DCH, an output terminal is connected to the first circuit point P(N); a control terminal of the sixth switch transistor T54 is inputted to the scanning electric level signal Q(N) of the Nth level scanning line, an input terminal is connected to the second direct current power source VSS2 and an output terminal is connected to the first circuit point P(N).

Wherein, the control terminal and the input terminal of the third switch transistor T51, the input terminal of the fifth switch transistor T53 serve as a third input terminal of the control unit 210; the input terminal of the fourth switch transistor T52 serves as a first input terminal of the control unit 210; the input terminal of the sixth switch transistor T54 serves as a second input terminal of the control unit 210, and the first circuit point serves as the output terminal of the control unit 210.

Further, the equivalent resistance of the fifth switch transistor T53 is smaller than the equivalent resistance of the sixth switch transistor T54. In this case, in the return circuit from the third direct current power source DCH passes through the fifth switch transistor T53 and the sixth switch transistor T54 to the second direct current power source VSS2, since the equivalent resistance of the fifth switch transistor T53 is smaller than the equivalent resistance of the sixth switch transistor T54, the voltage of the first circuit point P(N) can be ensured to be a higher voltage, and further makes the first switching transistor T51 and the second switching transistor T52 normally turned on.

The third switch transistor T51, the fourth switch transistor T52, the fifth switch transistor T53, and the sixth switch transistor T54 are respectively fabricated by the indium gallium zinc oxide.

In should be noted that each of the first switch transistor T32, the second switch transistor T42, the third switch transistor T51, the fourth switch transistor T52, the fifth switch transistor T53, and the sixth switch transistor T54 can be thin film transistors, i.e., a field effect transistor, accordingly, the input terminal is the source, the control terminal is the gate, and the output terminal is the drain, which will be understood by person skilled in the art and will not be described in detail herein. In addition, the voltages output from the first direct current power source VSS1 and the second direct current power source VSS2 are lower than the voltage outputted from the third direct current power source direct current respectively, that is, the first direct current power source VSS1 and the second direct current power source VSS2 are low voltage direct current power supplies respectively, and the output of which are low voltage, the third direct current power source DCH is a high voltage direct current power source, which outputs a high voltage, in which the low voltage and the high voltage are relatively limited, and the voltage value is not particularly limited.

The voltage outputted from the first direct current power source VSS1 and the second direct current power source VSS2 are low voltage, the voltage outputted from the third direct current power source DCH is a high voltage. For convenience of explanation, the voltage outputted from the first direct current power source VSS1 and the second direct current power source VSS2 are denoted as V1 and V2, respectively, and the voltage outputted from the third direct current power source DCH is denoted by V3, and it is understood from the above description that V1, V2 are lower than V3, and V2 is lower than V1.

Next, a description will be given of the principle of the above-described pull down maintaining circuit for solving the problem of the existence of the indium gallium zinc oxide.

Since the first direct current power source VSS1 outputs the scanning electric level signal Q(N) of the Nth level scanning line and the scanning signal G(N) of the Nth level scanning line through the second switch transistor T42 and the first switch transistor T32, respectively, therefore the low voltage of the scanning electric level signal Q(N) of the Nth level scanning line is V1, the scanning signal G(N) of the Nth level scanning line is also V1 and the first circuit point P(N) is connected to the second direct current power source VSS2 through the sixth switch transistor T54, so the low voltage of the first circuit point P(N) is V2, in the time, Vgs=V2−V1 of the first switch transistor T32 and the second switch transistor T42, since V2 is lower than V1, then Vgs is lower than 0, to be a negative value. In this case, the turn on voltage of the first switch transistor T32 and the second switch transistor T42 are greater than the negative value, the first switch transistor T32 and the second switch transistor T42 turned off to prevent the high voltage leaking during the operation of the scanning electric level signal Q(N) of the Nth level scanning line and the scanning signal G(N) of the Nth level scanning line, and can effectively compatible with the situation of the turn on voltage in negative value of the first switch transistor T32 and the second switch transistor T42 simultaneously.

Further, the input terminal of the fourth switch transistor T52 is connected to the first direct current power source VSS1, control terminal inputs the scanning electric level signal Q(N) of the Nth level scanning line, when the low voltage of the scanning electric level signal Q(N) of the Nth level scanning line is V1, the Vgs of the fourth switch transistor T52 is Vgs=V1−V1=0, at the time, when the turn on voltage of the fourth switch transistor T52 is greater than 0, the fourth switch transistor T52 can be preferably turned off, so that the positive voltage of the second circuit point S(N) is prevented from leaking, at this time, the fifth switching transistor T53 is turned on, and the control terminal of the sixth switching transistor T54 inputs the scanning electric level signal Q(N) of the Nth level scanning line, the input voltage is V1, the input terminal is connected to the second direct current power source VSS2, the input voltage is V2, then the sixth switch transistor T54 is turned on, since the equivalent resistance of the fifth switch transistor T53 is smaller than the equivalent resistance of the sixth switch transistor T54, the voltage of the first circuit point P(N) is a relatively high voltage, and thus the first switch transistor T32 and the second switch transistor T42 can be ensured to be normally turned on.

Besides, when the turn on voltage of the fourth switch transistor T52 is lower than 0, the fourth switch transistor T52 is slightly leaked, in this case, the equivalent resistance of the third switch transistor T51 is smaller than the equivalent resistance of the fourth switch transistor T52. In this case, in the return circuit from the third direct current power source DCH passes through the third switch transistor T51 and the fourth switch transistor T52 to the first direct current power source VSS1, since the equivalent resistance of the third switch transistor T51 is smaller than the equivalent resistance of the fourth switch transistor T54, the voltage of the second circuit point S(N), thereby reducing the risk of leakage of the fourth switch transistor T52.

Figure 3:
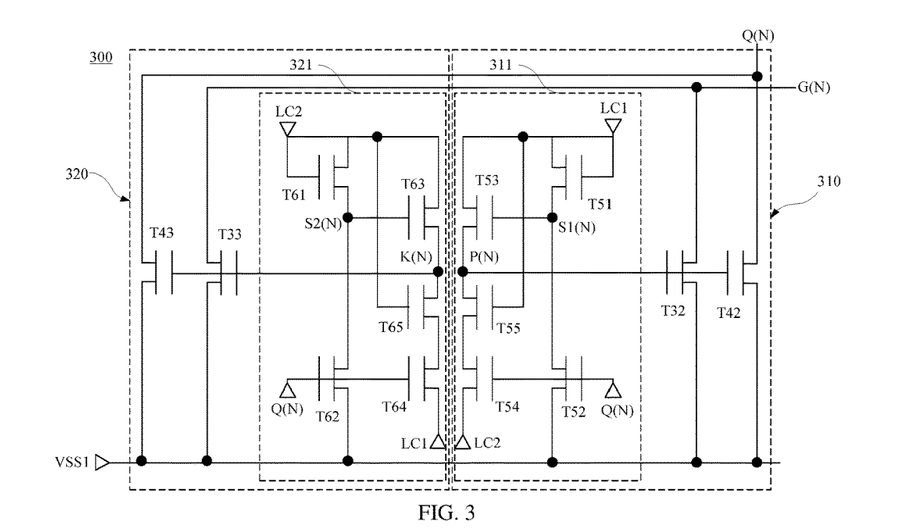
FIG. 3 is a schematic of a pull down maintaining circuit in a first embodiment of the present application.

FIG. 3 is a schematic diagram of a pull down maintaining circuit in the second embodiment of the of the present application, the pull down maintaining circuit 300 includes a first pull down maintaining unit 310 and a second pull down maintaining unit 320, in the present embodiment, the first pull down maintaining unit 310 and the second pull down maintaining unit 320 operate alternately with each other so that the scanning electric level signal Q(N) of the Nth level scanning line and the scanning signal G(N) of the Nth level scanning line outputted from the pull up circuit in the driving circuit are maintained at a low electric level.

The first pull down maintaining unit 310 includes a first switch transistor T32, a second switch transistor T42, and a first control unit 311. The second pull down maintaining unit 320 includes an eighth switch transistor T33, a ninth switch transistor T43, and a second control unit 321.

The input terminal of the first switch transistor T32 is connected to the first direct current power source VSS1, the output terminal outputted the scanning signal G(N) of the Nth level scanning line; an input terminal of the second switch transistor T42 is connected to the first direct current power source VSS1, an output terminal outputted the scanning electric level signal Q(N) of the Nth level scanning line; a first input terminal of the first control unit 311 is connected to the first direct current power source VSS1, a second input terminal is connected to a second low frequency alternating current power source LC2, and a third input terminal is connected to a first low frequency alternating current power source LC1, the output terminal is connected to the control terminal of the first switch transistor T32 and the control terminal of the second switch transistor T42.

The first control unit 311 is used to control the first switch transistor T32 and the second switch transistor T42 to turn off when a low voltage is outputted from the first direct current power source VSS1, the first low frequency alternating current power source LC1, and the second low frequency alternating current power source LC2, and to control the first switch transistor T32 and the second switch transistor T42 to normally turn on when a high voltage is outputted from the first direct current power source VSS1, the first low frequency alternating current power source LC1 and the second low frequency alternating current power source LC2.

An input terminal of the eighth switch transistor T33 is connected to the first direct current power source VSS1, an output terminal of the eighth switch transistor outputting the scanning signal G(N) of the Nth level scanning line; an input terminal of the ninth switch transistor T43 is connected to the first direct current power source VSS1, an output terminal outputted the scanning electric level signal Q(N) of the Nth level scanning line; the first input terminal of the second control unit 321 is connected to the first direct current power source VSS1, the second input terminal is connected to the first low frequency alternating current power source LC1, the third input terminal is connected to the second low frequency alternating current power source LC2, the output terminal is connected to the control terminal of the eighth switch transistor T33 and the control terminal of the ninth switch transistor T43.

The second control unit 321 is used to control the eighth switch transistor T33 and the ninth switch transistor T43 to turn off when a low voltage is outputted from the first direct current power source VSS1, the first low frequency alternating current power source LC1, and the second low frequency alternating current power source LC2, and to control the eighth switch transistor T33 and the ninth switch transistor T43 to be normally turned on when a high voltage is outputted from the first direct current power source VSS1, the first low frequency alternating current power source LC1 and the second low frequency alternating current power source LC2.

Wherein the voltage outputted from the first low frequency alternating current power source LC1 is opposite to the voltage output from the second low frequency alternating current power source LC2, and the low voltage is lower than the voltage outputted from the first Direct current power source VSS1; the first switch transistor T32, the second switch transistor T42, the eighth switch transistor T33 and the ninth switch transistor T43 is fabricated by indium gallium zinc oxide.

Figure 4:
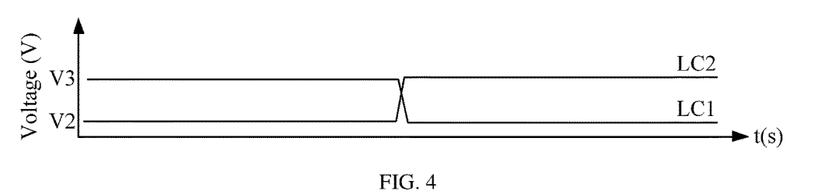
FIG. 4 is a voltage schematic diagram of the alternating current power source adopted in FIG. 3.

The difference between the present embodiment and the above-described embodiment is the first low frequency alternating current power source LC1, the second low frequency alternating current power source LC2, and the first low voltage direct current power source are used by the first control unit 311 and the second control unit 321, respectively, wherein the voltage outputted from the first low frequency alternating current power source LC1 is opposite to the voltage output from the second low frequency alternating current power source LC2. As illustrated in FIG. 4, when the first low frequency alternating current power source LC1 outputs a high voltage, the second low frequency alternating current power source LC2 outputs a low voltage. Likewise, when the first low frequency alternating current power source LC1 outputs a low voltage, the low frequency alternating current power source LC2 outputs a high voltage, so that the pull down maintaining circuit of the present embodiment is alternately operates by two pull down maintaining units. It should be noted that, the high voltage of the first low frequency alternating current power source LC1 and the second low frequency alternating current power source LC2 is the voltage outputted from the third direct current power source DCH of the above-described embodiment, i.e., V3, and the low voltage is the voltage outputted from the second direct current power source VSS2 of the above-described embodiment, that is V2.

In the present embodiment, each of the pull down maintaining units during operation can be effectively compatible with the situation of the turn on voltage in negative value of the thin film transistor fabricated by IGZO. In addition, the use of the first low frequency alternating current power source LC1 and the second low frequency alternating current power source LC2 increases the stability of the circuit and reduces the use of the low voltage direct current power source, thereby reducing the number of signals and reducing the cost of the integrated circuit, which facilitates the fabrication of the driving circuit of the narrow border.

Further, the low voltage is a low voltage outputted from the first low frequency alternating current power source LC1 or the second low frequency alternating current power source LC2. Therefore the low voltage outputted from the first low frequency alternating current power source LC1 or the second low frequency alternating current power source LC2 is lower than the voltage output from the first direct current power source VSS1, that is V2 is lower than V1. It should be noted that the low voltage herein means a low voltage outputted by the first control unit 311 when controlling the first switch transistor T32 and the second switch transistor T42 to be turned off, or the low voltage outputted by the second control unit 321 when controlling the eighth switch T33 and the ninth switch T43 to be turned off.

Specifically, the first control unit 311 includes a third switch transistor T51, a fourth switch transistor T52, a fifth switch transistor T53, a sixth switch transistor T54, and a seventh switch transistor T55. Wherein, the control terminal and the input terminal of the third switch transistor T51 are connected to the first low frequency alternating current power source LC1, respectively, the output terminal is connected to the second circuit point S1(N); the control terminal of the fourth switch transistor T52 inputs the scanning electric level signal Q(N) of the Nth level scanning line, the input terminal is connected to the first direct current power source VSS1, the output terminal is connected to the second circuit point S1(N); the control terminal of the fifth switch transistor T53 is connected to the second circuit point S1(N), the input terminal is connected to the first low frequency alternating current power source LC1, the output terminal is connected to the first circuit point P(N); the control terminal of the sixth switch transistor T54 inputs the scanning electric level signal Q(N) of the Nth level scanning line, the input terminal is connected to the second low frequency alternating current power source LC2; the input terminal of the seventh switch transistor T55 is connected to the output terminal of the sixth switch transistor T54, the output terminal is connected to the first circuit point P(N), the control terminal is connected to the first low frequency alternating current power source LC1; the control terminal and the input terminal of the third switch transistor T51 and the input terminal of the fifth switch transistor T53 serves as the third input terminal of the first control unit 311; the input terminal of the fourth switch transistor T52 serves as the first input terminal of the first control unit 311; the input terminal of the sixth switch transistor T54 serves as the second input terminal of the first control unit 311; the first circuit point P(N) serves as the output terminal of the first control unit 311.

The second control unit 321 includes a tenth switch transistor T61, an eleventh switch transistor T62, a twelfth switch transistor T63, a thirteenth switch transistor T64, and a fourteenth switch transistor T65. Wherein the control terminal and the input terminal of the tenth switch transistor T61 are connected to the second low frequency alternating current power source LC2 respectively, the output terminal is connected to the fourth circuit point S2(N); the control terminal of the eleventh switch transistor T62 inputs the scanning electric level signal Q(N) of the Nth level scanning line, the input terminal is connected to the first direct current power source VSS1, the output terminal is connected to a fourth circuit point S2(N); a control terminal of the twelfth switch transistor T63 is connected to the fourth circuit point S2(N), the input terminal is connected to the second low frequency alternating current power source LC2, the output terminal is connected to a third circuit point K(N); the control terminal of the thirteenth switch transistor T64 inputs the scanning electric level signal Q(N) of the Nth level scanning line, the input terminal is connected to the first low frequency Alternating current power source LC1; the input terminal of the fourteenth switch transistor T65 is connected to the output terminal of the thirteenth switch transistor T64, the output terminal is connected to the third circuit point K(N), the control terminal is connected to the second low frequency alternating current power source LC2; the control terminal and the input terminal of the tenth switch transistor T61, the input terminal of the thirteenth switch transistor T64 serve as a third input terminal of the second control unit 321; the input terminal of the eleventh switch transistor T62 serves as a first input terminal of the second control unit 321; the input terminal of the thirteenth switch transistor T64 serves as a second input terminal of the second control unit 321; the second circuit point S1(N) serves as the output terminal of the second control unit 321.

Further, the equivalent resistance of the fifth switch transistor T53 is smaller than the equivalent resistance of the sixth switch transistor T54; the equivalent resistance of the twelfth switch transistor T63 is smaller than the equivalent resistance of the thirteenth switch transistor T64.

The third switch transistor T51, the fourth switch transistor T52, the fifth switch transistor T53, the sixth switch transistor T54, the seventh switch transistor T55, the tenth switch transistor T61, the eleventh switch transistor T62, the twelfth switch transistor T63, the thirteenth switch transistor T64 and the fourteenth switch transistor T65 are fabricated by indium gallium zinc oxide respectively.

Figure 5:
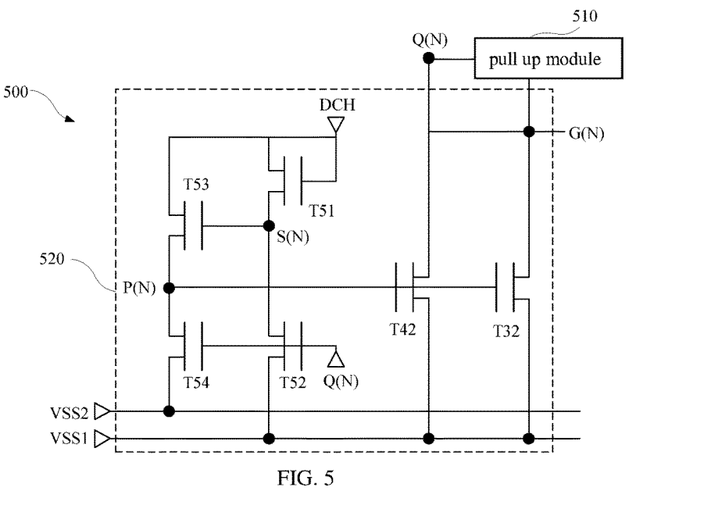
FIG. 5 is a schematic of a driving circuit in the first embodiment of the present application.

The principle to solve the problems existed by the fabrication of indium gallium zinc oxide of each of the pull down maintaining unit in the pull down maintaining circuit in the present embodiment is the same, and in the scope by the person skilled in the art, and will not be described here. Similarly, in order to reduce the risk of leakage of the fourth switch transistor T52 and the eleventh switch transistor T62, the equivalent resistance of the third switch transistor T51 is smaller than the equivalent resistance of the fourth switch transistor T52, and the equivalent of the tenth switch transistor T61 is smaller than the equivalent resistance of the eleventh switch transistor T62, the detail is referred as described in the above-described embodiment. And the first control unit 311 and the second control unit 321 of the present embodiment are additionally provided with the seventh switch transistor T55 and the fourteenth switch transistor T65, respectively, with respect to the control unit in the pull down maintaining circuit of the above-described embodiment. If the first pull down maintaining unit 310 is in operation and the second pull down maintaining unit 320 is inactive, at this time, the voltage of the first low frequency alternating current power source LC1 is a high voltage, and the voltage of the second low frequency alternating current power source LC2 is a low voltage, if there is no fourteenth switch transistor T65 in the second control unit 321, when the scanning electric level signal Q(N) of the Nth level scanning line is a high voltage, the thirteenth switch transistor T64 is turned on, the high voltage of the first low frequency alternating current power source LC1 will be written, the voltage of the third circuit point K(N) is a high voltage, at this time, the eighth switch transistor T33 and the ninth switch transistor T43 are turned on, and then the scanning electric level signal Q(N) of the Nth level scanning line and the scanning signal G(N) of the Nth level scanning line are pulled to the voltage outputted from the first direct current power source VSS1, i.e., the low voltage V1, so that the high voltage cannot be normally inputted. Therefore, the fourteenth switch transistor T65 is added to block the high voltage of the first low frequency alternating current power source, and preventing the affecting of the output waveform normally of the scanning signal G(N) of the Nth level scanning line. Similarly, the seventh switch transistor T55 is block the high voltage of the second low frequency alternating current power source, and preventing the affecting of the output waveform normally of the scanning signal G(N) of the Nth level scanning line. As illustrated in FIG. 5 is a schematic of a driving circuit in the first embodiment of the present application, the driving circuit 500 is used for performing driving operation of the Nth level scanning line of a liquid crystal display, which includes a pull up module 510 and a pull down maintaining module 520.

The pull up module 510 is for pulling up the scanning signal of the Nth level scanning line in accordance with the scanning electric level signal of the Nth level scanning line and a clock signal.

The pull down maintaining module 520 is for maintaining the scanning electric level signal of the Nth level scanning line and the low electric level of the scanning signal of the Nth level scanning line outputted from the pull up module.

Wherein, the pull down maintaining module 520 is the circuit in the above-described first embodiment. The detailed description can refer to the description in the above embodiments, the pull up module 510 is not limited in the present application, in the scope by the person skilled in the art, and will not be described here. It should be noted, the driving circuit 500 further includes a pull down module, a bootstrap capacitor, and the like, in the scope by the person skilled in the art, and will not be described here.

Figure 6:
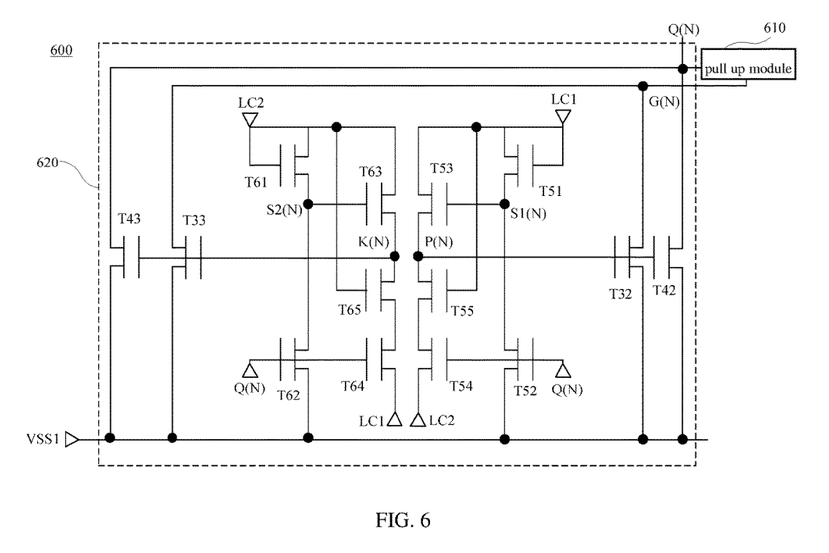
FIG. 6 is a schematic of a driving circuit in the second embodiment of the present application.

As illustrated in FIG. 6, it is a schematic of a driving circuit in the first embodiment of the present application, the driving circuit 600 is used for performing driving operation of the Nth level scanning line of a liquid crystal display, which includes a pull up module 610 and a pull down maintaining module 620.

The pull up module 610 is for pulling up the scanning signal of the Nth level scanning line in accordance with the scanning electric level signal of the Nth level scanning line and a clock signal.

The pull down maintaining module 620 is for maintaining the scanning electric level signal of the Nth level scanning line and the low electric level of the scanning signal of the Nth level scanning line outputted from the pull up module.

Wherein, the pull down maintaining module 620 is the circuit in the above-described first embodiment. The detailed description can refer to the description in the above embodiments, the pull up module 610 is not limited in the present application, in the scope by the person skilled in the art, and will not be described here. It should be noted, the driving circuit 600 further includes a pull down module, a bootstrap capacitor, and the like, in the scope by the person skilled in the art, and will not be described here.

Figure 7:
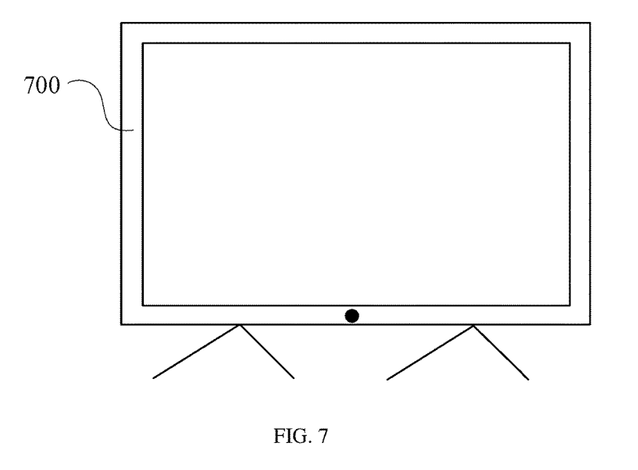
FIG. 7 is a schematic diagram of a display apparatus of the present application.

As illustrated in FIG. 7 is a schematic diagram of an embodiment of a display apparatus of the present application, including a casing 700 and a driving circuit (not shown) in the above-described embodiment provided inside the casing 700. The technical features of the driving circuit are described in detail in the above embodiments and can be referred, and other technical features of the other structure of the display apparatus are within the scope of person skilled in the art and will not be described here.

Above are embodiments of the present application, which does not limit the scope of the present application. Any modifications, equivalent replacements or improvements within the spirit and principles of the embodiment described above should be covered by the protected scope of the invention.

What is claimed is:

1. A driving circuit for performing driving operation of an Nth level scanning line of a liquid crystal display, comprising:
    a pull up module for pulling up a scanning signal of the Nth level scanning line in accordance with a scanning electric level signal of the Nth level scanning line and a clock signal;
    a pull down maintaining module for maintaining the scanning electric level signal of the Nth level scanning line and a low electric level of the scanning signal of the Nth level scanning line outputted from the pull up module;
    wherein the pull down maintaining module comprising:
    a first switch transistor, an input terminal is connected to a first direct current power source, and an output terminal outputting the scanning signal of the Nth level scanning line;
    a second switch transistor, an input terminal is connected to the first direct current power source, and an output terminal outputting the scanning electric level signal of the Nth level scanning line;
    wherein a control terminal of the first switch transistor and a control terminal of the second switch transistor are connected to a first circuit point;

a control unit, a first input terminal is connected to the first direct current power source, a second input terminal is connected to a second direct current power source, a third input terminal is connected to a third direct current power source, an output terminal is connected to the control terminal of the first switch transistor and the control terminal of the second switch transistor respectively wherein a voltage outputted from the first direct current power source is a first low level voltage, a voltage outputted from the second direct current power source is a second low level voltage, a voltage outputted from the third direct current power source is a first high level voltage;

wherein the second low level voltage is lower than the first low level voltage outputted from the first direct current power source, both the first low level voltage outputted from the first direct current power source and the second low level voltage outputted from the second direct current power source are lower than the first high level voltage outputted from the third direct current power source; the first switch transistor and the second switch transistor are fabricated by indium gallium zinc oxide respectively;

the control unit comprising:

a third switch transistor, a control terminal and an input terminal are respectively connected to the third direct current power source, an output terminal is connected to a second circuit point;

a fourth switch transistor, a control terminal is inputted the scanning electric level signal of the Nth level scanning line, an input terminal is connected to the first direct current power source, an output terminal is connected to the second circuit point;

a fifth switch transistor, a control terminal is connected to the second circuit point, an input terminal is connected to the third direct current power source, an output terminal is connected to the first circuit point;

a sixth switch transistor, a control terminal is inputted the scanning electric level signal of the Nth level scanning line, an input terminal is connected to the second direct current power source and an output terminal is connected to the first circuit point;

wherein, the control terminal of the third switch transistor and the input terminal of the third switch transistor, the input terminal of the fifth switch transistor serve as the third input terminal of the control unit; the input terminal of the fourth switch transistor serves as the first input terminal of the control unit; the input terminal of the sixth switch transistor serves as the second input terminal of the control unit; the first circuit point serves as the output terminal of the control unit;

wherein when the scanning electric level signal of the Nth level scanning line is a high level voltage, the fourth switch transistor and the sixth switch transistor turn on, and a voltage of the first circuit point is equal to the second low level voltage, and the first switch transistor and the second switch transistor turn off;

when the scanning electric level signal of the Nth level scanning line is a low level voltage, the third switch transistor and the fourth switch transistor turn off, and the voltage of the first circuit point is equal to the first high level voltage, and the first switch transistor and the second switch transistor turn on, which pull a voltage of the scanning signal of the Nth level scanning line down to the first low level voltage;

an equivalent resistance of the fifth switch transistor is smaller than an equivalent resistance of the sixth switch transistor; and the third switch transistor, the fourth switch transistor, the fifth switch transistor, and the sixth switch transistor are respectively fabricated by the indium gallium zinc oxide.

2. A pull down maintaining circuit applied for the Nth level driving circuit of the liquid crystal display, comprising:

a first switch transistor, an input terminal is connected to a first direct current power source, and an output terminal outputting a scanning signal of the Nth level scanning line;

a second switch transistor, an input terminal is connected to the first direct current power source, and an output terminal outputting a scanning electric level signal of the Nth level scanning line;

wherein a control terminal of the first switch transistor and a control terminal of the second switch transistor are connected to a first circuit point;

a control unit, a first input terminal is connected to the first direct current power source, a second input terminal is connected to a second direct current power source, a third input terminal is connected to a third direct current power source, an output terminal is connected to the control terminal of the first switch transistor and the control terminal of the second switch transistor respectively;

wherein a voltage outputted from the first direct current power source is a first low level voltage, a voltage outputted from the second direct current power source is a second low level voltage, a voltage outputted from the third direct current power source is a first high level voltage;

wherein the second low level voltage is lower than the first low level voltage outputted from the first direct current power source, both the first low level voltage outputted from the first direct current power source and the second low level voltage outputted from the second direct current power source are lower than the first high level voltage outputted from the third direct current power source; the first switch transistor and the second switch transistor are fabricated by indium gallium zinc oxide respectively;

the control unit comprising:

a third switch transistor, a control terminal and an input terminal are respectively connected to the third direct current power source, an output terminal is connected to a second circuit point;

a fourth switch transistor, a control terminal is inputted the scanning electric level signal of the Nth level scanning line, an input terminal is connected to the first direct current power source, an output terminal is connected to the second circuit point;

a fifth switch transistor, a control terminal is connected to the second circuit point, an input terminal is connected to the third direct current power source, an output terminal is connected to the first circuit point;

a sixth switch transistor, a control terminal is inputted the scanning electric level signal of the Nth level scanning line, an input terminal is connected to the second direct current power source and an output terminal is connected to the first circuit point; and wherein, the control terminal and the input terminal of the third switch transistor, the input terminal of the fifth switch transistor serve as the third input terminal of the control unit; the input terminal of the fourth switch transistor serves as the first input terminal of the control unit; the input terminal of the sixth switch transistor serves as the second input terminal of the control unit; the first circuit point serves as the output terminal of the control unit;

wherein when the scanning electric level signal of the Nth level scanning line is a high level voltage, the fourth switch transistor and the sixth switch transistor turn on, and a voltage of the first circuit point is equal to the second low level voltage, and the first switch transistor and the second switch transistor turn off;

when the scanning electric level signal of the Nth level scanning line is a low level voltage, the third switch transistor and the fourth switch transistor turn off, and the voltage of the first circuit point is equal to the first high level voltage, and the first switch transistor and the second switch transistor turn on, which pull a voltage of the scanning signal of the Nth level scanning line down to the first low level voltage.

3. The circuit according to claim 2, wherein an equivalent resistance of the fifth switch transistor is smaller than an equivalent resistance of the sixth switch transistor; and the third switch transistor, the fourth switch transistor, the fifth switch transistor, and the sixth switch transistor are respectively fabricated by the indium gallium zinc oxide.

4. A pull down maintaining circuit applied for the Nth level driving circuit of the liquid crystal display comprising a first pull down maintaining unit and a second pull down maintaining unit, wherein:

the first pull down maintaining unit comprising:

a first switch transistor, an input terminal is connected to a first direct current power source, an output terminal outputted the scanning signal of the Nth level scanning line;

a second switch transistor, an input terminal is connected to the first direct current power source, an output terminal outputting a scanning electric level signal of the Nth level scanning line;

wherein a control terminal of the first switch transistor and a control terminal of the second switch transistor are connected to a first circuit point;

a first control unit, a first input terminal is connected to the first direct current power source, a second input terminal is connected to a second low frequency alternating current power source, a third input terminal is connected to a first low frequency alternating current power source, an output terminal is connected to the control terminal of the first switch transistor and the control terminal of the second switch transistor, the first control unit is used to control the first switch transistor and the second switch transistor;

wherein a voltage outputted from the first direct current power source is a first low level voltage, a voltage outputted from the first low frequency alternating current power source is a second low level voltage, a voltage outputted from the third direct current power source is a first high level voltage;

the second pull down maintaining unit comprising:

an eighth switch transistor, an input terminal is connected to the first direct current power source, an output terminal outputting the scanning signal of the Nth level scanning line;

a ninth switch transistor, an input terminal is connected to the first direct current power source, an output terminal outputting the scanning electric level signal of the Nth level scanning line;

a second control unit, a first input terminal is connected to the first direct current power source, a second input terminal is connected to the first low frequency alternating current power source, a third input terminal is connected to the second low frequency alternating current power source, an output terminal is connected to the control terminal of the eighth switch transistor and the control terminal of the ninth switch transistor;

wherein the voltage outputted from the first low frequency alternating current power source is opposite in polarity to the voltage output from the second low frequency alternating current power source, and a lower voltage between the voltage outputted from the first low frequency alternating current power source and the voltage output from the second low frequency alternating current power source is lower than the voltage outputted from the first direct current power source; the first switch transistor, the second switch transistor, the eighth switch transistor and the ninth switch transistor are fabricated by indium gallium zinc oxide.

5. The circuit according to claim 4, wherein the first control unit comprising:

a third switch transistor, a control terminal and an input terminal are connected to the first low frequency alternating current power source, respectively, an output terminal is connected to a second circuit point;

a fourth switch transistor, a control terminal inputs the scanning electric level signal of the Nth level scanning line, an input terminal is connected to the first direct current power source, an output terminal is connected to the second circuit point;

a fifth switch transistor, a control terminal is connected to the second circuit point, an input terminal is connected to the first low frequency alternating current power source, an output terminal is connected to a first circuit point;

a sixth switch transistor, a control terminal inputs the scanning electric level signal of the Nth level scanning line, an input terminal is connected to the second low frequency alternating current power source;

a seventh switch transistor, an input terminal is connected to the output terminal of the sixth switch transistor, an output terminal is connected to the first circuit point, a control terminal is connected to the first low frequency alternating current power source;

wherein the control terminal and the input terminal of the third switch transistor and the input terminal of the fifth switch transistor serve as the third input terminal of the first control unit; the input terminal of the fourth switch transistor serves as the first input terminal of the first control unit; the input terminal of the sixth switch transistor serves as the second input terminal of the first control unit; the first circuit point serves as the output terminal of the first control unit;

the second control unit comprising:

a tenth switch transistor, a control terminal and an input terminal of the tenth switch transistor are connected to the second low frequency alternating current power source respectively, an output terminal is connected to a fourth circuit point;

an eleventh switch transistor, a control terminal inputs the scanning electric level signal of the Nth level scanning line, an input terminal is connected to the first direct current power source, an output terminal is connected to the fourth circuit point;

a twelfth switch transistor, a control terminal is connected to the fourth circuit point, an input terminal is connected to the second low frequency alternating current power source, an output terminal is connected to a third circuit point;

a thirteenth switch transistor, a control terminal inputs the scanning electric level signal of the Nth level scanning line, an input terminal is connected to the first low frequency alternating current power source;

a fourteenth switch transistor, an input terminal is connected to the output terminal of the thirteenth switch transistor, an output terminal is connected to the third circuit point, a control terminal is connected to the second low frequency alternating current power source; wherein the control terminal and the input terminal of the tenth switch transistor, the input terminal of the thirteenth switch transistor serve as the third input terminal of the second control unit; the input terminal of the eleventh switch transistor serves as the first input terminal of the second control unit; the input terminal of the thirteenth switch transistor serves as the second input terminal of the second control unit; the second circuit point serves as the output terminal of the second control unit.

6. The circuit according to claim 5, wherein an equivalent resistance of the fifth switch transistor is smaller than an equivalent resistance of the sixth switch transistor;

an equivalent resistance of the twelfth switch transistor is smaller than an equivalent resistance of the thirteenth switch transistor;

the third switch transistor, the fourth switch transistor, the fifth switch transistor, the sixth switch transistor, the seventh switch transistor, the tenth switch transistor, the eleventh switch transistor, the twelfth switch transistor, the thirteenth switch transistor and the fourteenth switch transistor are fabricated by indium gallium zinc oxide respectively.

* * * * *